United States Patent Office 3,092,646
Patented June 4, 1963

3,092,646
ORGANOMANGANESE COMPOSITIONS
Geoffrey Wilkinson, 56B Porchester Terrace,
London, England
No Drawing. Filed Mar. 15, 1960, Ser. No. 15,037
7 Claims. (Cl. 260—429)

This invention relates to and has as its principal object the provision of novel chemical compounds useful as antiknock additives and as fuel dyes and of methods for their preparation.

These compounds are organophosphorus, -arsenic and -antimony derivatives of manganese carbonyl halides, which have the general formula:

$$(R_3Z)_2Mn(CO)_3X$$

wherein R represents an alkyl, cycloalkyl, aryl, alkaryl or aralkyl radical containing up to about 12 carbon atoms, Z represents phosphorus, arsenic or antimony, i.e., an element of group V–A of the periodic system having an atomic number from 15 to 51, inclusive, and X is halogen.

Preferred embodiments of the present invention are $Mn(CO)_3X(Ph_3P)_2$ and $Mn(CO)_3X(Ph_3As)_2$, where X is chlorine, bromine or iodine and Ph is phenyl or mono- or polyalkylphenyl having up to about 12 carbon atoms. These compounds are particularly resistant to thermal decomposition.

The compounds of this invention are stable at ordinary temperatures. They possess nonionic structures and, accordingly, are soluble in organic media including hydrocarbons and chlorohydrocarbons.

Two method have been discovered for the preparation of the compounds of this invention. Both methods involve the reaction of phosphines, arsines or stibines with an appropriate manganese reactant. The organophosphorus, -arsenic or -antimony component can be reacted (A) with a manganese pentacarbonyl halide or (B) with a dimeric manganese tetracarbonyl halide. The second method is another preferred embodiment of this invention because the reaction proceeds at a lower temperature and at a faster rate than the first.

The organic ligands herein described are capable of replacing part of the carbon monoxide of manganese pentacarbonyl halide or of manganese tetracarbonyl halide dimer to yield stable compounds which can readily be prepared and stored without special precautions for future use. Accordingly, the rate of carbon monoxide evolution is a convenient index of the rate of reaction. Furthermore, cessation of carbon monoxide evolution indicates completion of reaction.

The following examples in which all parts and percentages are by weight illustrate the preparation of the compounds of this invention.

*Example I*

20 parts of manganese tetracarbonyl chloride dimer was heated under nitrogen with 260 parts of triphenyl phosphine for 30 minutes at a temperature of 100° C. The product, after cooling, was washed 3 times with 1000 parts of ether to remove the excess of triphenyl phosphine. The residual solid was extracted with 250 parts of chloroform in the cold; the chloroform solution was filtered and treated with 1000 parts of light petroleum. The solution was allowed to crystallize overnight and, after removal of the mother liquor, the crystals were washed with 250 parts of light petroleum and the excess of solvent was removed by evacuation at room temperature. The pure product, manganese tricarbonyl chloride bis-triphenyl phosphine, $Mn(CO)_3Cl(Ph_3P)_2$, was obtained in 74 percent yield.

Color: Cream
Infrared: CO stretching modes (cm.$^{-1}$)—2049, 1954, 1917
Analysis:
    Found—C, 62.8; H, 4.7 percent
    Required—C, 62.0; H, 4.3 percent

*Example II*

25 parts of manganese pentacarbonyl bromide was heated with 150 parts of triphenyl arsine under nitrogen until the steady stream of carbon monoxide ceased (about 1 hour) at a temperature of 120° C. The isolation of the pure product, manganese tricarbonyl bromide bis-triphenylarsine, $Mn(CO)_3Br(Ph_3As)_2$, was carried out as in Example I above. The yield was 72 percent.

Color: Orange
Infrared: CO stretching modes (cm.$^{-1}$)—2025, 2055, 1958 (weak), 1918 (weak)
Analysis:
    Found—C, 57.0; H, 4.2; As, 18.4 percent
    Required—C, 56.3; H, 3.6; As, 18.1 percent

*Example III*

The procedure of Example II was applied to the reaction of manganese pentacarbonyl iodide with triphenyl phosphine. The product, manganese tricarbonyl iodide bis-triphenylphosphine, $Mn(CO)_3I(Ph_3P)_2$, was obtained in 81 percent yield.

Color: Light brown
Infrared: CO stretching modes (cm.$^{-1}$)—2042, 1955, 1915
Analysis:
    Found—C, 58.3; H, 4.0; P, 7.3; Hal, 15.9 percent
    Required—C, 59.2; H, 3.8; P, 7.8; Hal, 16.1 percent

*Example IV*

Using the procedure of Example II, manganese pentacarbonyl bromide was reacted with triphenylphosphine. The product, manganese tricarbonyl bromide bis-triphenylphosphosphine, $Mn(CO)_3Br(Ph_3P)_2$, was obtained in 67 percent yield.

Color: Light brown
Infrared: CO stretching modes (cm.$^{-1}$)—2046, 1955, 1916
Analysis:
    Found—C, 63.5; H, 4.4; Hal, 10.2 percent
    Required—C, 63.1; H, 4.0; Hal, 10.8 percent

*Example V*

Using the procedure of Example I, manganese tetracarbonyl chloride dimer was reacted with triphenylarsine. The product, manganese tricarbonyl chloride bis-triphenylarsine, $Mn(CO)_3Cl(Ph_3As)_2$, was obtained in 61 percent yield.

Color: Yellow
Infrared: CO stretching modes (cm.$^{-1}$)—2050, 1960, 1915
Analysis:
    Found—C, 59.9; H, 4.5; Hal, 4.1 percent
    Required—C, 59.5; H, 3.8; Hal, 4.5 percent

*Example VI*

Using the procedure of Example I, manganese tetracarbonyl iodide dimer was reacted with triphenylarsine. The product, manganese tricarbonyl iodide bis-triphenylarsine, $Mn(CO)_3I(Ph_3As)_2$, was obtained in 56 percent yield.

Color: Dark orange
Infrared: CO stretching modes (cm.$^{-1}$)—2012, 2041, 1955 (weak), 1918 (weak)
Analysis:
 Found—C, 53.2; H, 3.8; Hal, 14.9 percent
 Required—C, 53.2; H, 3.4; Hal, 14.5 percent

*Examples VII to XXII, Inclusive*

These examples are summarized in the following table.

| Ex. | Mn reactant | Ligand | Approximate time of heating, Hours | Product |
|---|---|---|---|---|
| VII | $Mn(CO)_5F$ | $(CH_3)_3P$ | 0.5 | Manganese tricarbonyl fluoride bis-trimethylphosphine. |
| VIII | $[Mn(CO)_4Br]_2$ | $(CH_3)_3As$ | 0.3 | Manganese tricarbonyl bromide bis-trimethylarsine. |
| IX | $Mn(CO)_5I$ | $(CH_3)_3Sb$ | 0.5 | Manganese tricarbonyl iodide bis-trimethylstibine. |
| X | $[Mn(CO)_4F]_2$ | $(C_6H_{13})_3As$ | 0.5 | Manganese tricarbonyl fluoride bis-tri-n-hexylarsine. |
| XI | $Mn(CO)_5Cl$ | $(C_6H_{13})_3P$ | 1 | Manganese tricarbonyl chloride bis-tri-n-hexylphosphine. |
| XII | $[Mn(CO)_4Br]_2$ | $(C_6H_{13})_3Sb$ | 0.5 | Manganese tricarbonyl bromide bis-tri-n-hexylstibine. |
| XIII | $Mn(CO)_5Cl$ | $(C_{12}H_{25})_3Sb$ | 2 | Manganese tricarbonyl chloride bis-tri-n-dodecylstibine. |
| XIV | $[Mn(CO)_4Br]_2$ | $(C_{12}H_{25})_3P$ | 1.5 | Manganese tricarbonyl bromide bis-tri-n-dodecylphosphine. |
| XV | $Mn(CO)_5I$ | $[2,4,6-(CH_3)_3-C_6H_2]_3As$ | 4 | Manganese tricarbonyl iodide bis-trimesitylarsine. |
| XVI | $[Mn(CO)_4F]_2$ | $Ph_3Sb$ | 3 | Manganese tricarbonyl fluoride triphenylstibine. |
| XVII | $Mn(CO)_5F$ | $(PhCH_2)_3P$ | 5 | Manganese tricarbonyl fluoride tribenzylphosphine. |
| XVIII | $[Mn(CO)_4Br]_2$ | $(CH_3 \cdot C_6H_4)_3Sb$ | 5 | Manganese tricarbonyl bromide tri-p-tolylstibine. |
| XIX | $Mn(CO)_5I$ | $(PhCH_2)_3As$ | 6 | Manganese tricarbonyl iodide tribenzylarsine. |
| XX | $[Mn(CO)_4F]_2$ | $(Cyc-C_6H_{11})_3Sb$ | 5 | Manganese tricarbonyl fluoride tri-cyclohexylstibine. |
| XXI | $Mn(CO)_5Cl$ | $(Cyc-C_6H_{11})_3As$ | 7 | Manganese tricarbonyl chloride tri-cyclohexylarsine. |
| XXII | $[Mn(CO)_4I]_2$ | $(4-C_6H_5 \cdot C_6H_4)_3P$ | 4 | Manganese tricarbonyl iodide tris-(4)biphenylylphosphine. |

The compounds of this invention are soluble in hydrocarbon fuels, e.g., gasoline, to which they impart valuable antiknock properties. The amounts to be employed depend upon the nature of the fuel and upon the operating conditions under which the latter is to be used. In general, amounts of the order of 0.005 to 0.25 percent by weight of the fuel are satisfactory.

Various compounds of this invention, being highly colored, are useful as fuel dyes, and the intensity of the color of the fuel containing them can be taken as a measure of their contribution to the antiknock rating of the treated fuel.

As stated above, the compositions of this invention can be prepared either from the manganese pentacarbonyl halide or from the manganese tetracarbonyl halide dimer by reacting the same with an appropriate phosphine, arsine or stibine at a temperature at which carbon monoxide is evolved. The organic ligands in the resultant products include the trialkyl, -cycloalkyl, -aryl, -alkaryl and -aralkyl derivatives of phosphorus, arsenic and antimony. The temperature employed depends upon the structure of the manganese carbonyl halide used and, in general, upon the thermal stabilities of the reactants and products and can range from about 80° C. to about 130° C. or above. The reactions are carried out preferably under an atmosphere of nitrogen but any other atmosphere inert to reactants and products, e.g., anhydrous neon, argon, krypton, hydrogen, paraffin hydrocarbon vapors or the like can be used. The products are generally soluble in halohydrocarbon solvents and these are good solvents for the extraction step. Specifically, simple chloroalkanes such as chloroform, carbon tetrachloride, etc., are useful for this purpose. If desired, a suitable inert, anhydrous liquid reaction solvent can be employed in the process of this invention.

Methods for the preparation of the reactants used in forming the novel compounds of this invention are reported in the literature.

I claim:
1. The method of preparing a compound represented by the general formula:

$$(R_3Z)_2Mn(CO)_3X$$

wherein R is a hydrocarbyl radical containing up to about 12 carbon atoms and is selected from the group consisting of alkyl, cycloalkyl, aryl, alkaryl and aralkyl radicals, Z is an element of group V–A of the periodic system having an atomic number from 16 to 51, inclusive, and X is a halogen having an atomic number from 9 to 53, inclusive, which comprises reacting a dimeric manganese tetracarbonyl halide wherein the halogen has an atomic number from 9 to 53, inclusive, with a compound represented by the general formula:

$$R_3Z$$

wherein R and Z have the meaning hereinabove assigned.
2. Manganese tricarbonyl chloride bis-triphenylphosphine.
3. Manganese tricarbonyl bromide bis-triphenylphosphine.
4. Manganese tricarbonyl iodide bis-triphenylphosphine.
5. Manganese tricarbonyl chloride bis-triphenylarsine.
6. Manganese tricarbonyl bromide bis-triphenylarsine.
7. Manganese tricarbonyl iodide bis-triphenylarsine.

References Cited in the file of this patent

UNITED STATES PATENTS 2,880,067    Closson et al.    Mar. 31, 1959
2,902,489    Coffield et al.    Sept. 1, 1959

OTHER REFERENCES

Abel et al.: "Journal of the Chemical Society" (London), pp. 2323–2327 (1959).
Latimer et al.: "Reference Book of Inorganic Chemistry," pp. 224–225 (1951).

UNITED STATES PATENT OFFICE
CERTIFICATE OF CORRECTION

Patent No. 3,092,646                      June 4, 1963

Geoffrey Wilkinson

It is hereby certified that error appears in the above numbered patent requiring correction and that the said Letters Patent should read as corrected below.

Column 2, line 43, for "ylphosphosphine" read -- ylphosphine --; column 4, line 32, for "16 to 51" read -- 15 to 51 --.

Signed and sealed this 21st day of January 1964.

(SEAL)
Attest:

ERNEST W. SWIDER
Attesting Officer

EDWIN L. REYNOLDS

Acting Commissioner of Patents